No. 647,974. Patented Apr. 24, 1900.
W. B. LEONARD.
BALING PRESS.
(Application filed Mar. 2, 1899.)
(No Model.) 5 Sheets—Sheet 1.

Witnesses
H. C. Wilkinson
Jacob E. Fine

Inventor
W. B. Leonard
by George S. Black
His Attorney

No. 647,974. Patented Apr. 24, 1900.
W. B. LEONARD.
BALING PRESS.
(Application filed Mar. 2, 1899.)

(No Model.) 5 Sheets—Sheet 3.

Witnesses,
H. C. Wilkinson
Jacob E. Fine

Inventor
Wm. B. Leonard
by George S. Black
His Attorney.

No. 647,974. Patented Apr. 24, 1900.
W. B. LEONARD.
BALING PRESS.
(Application filed Mar. 2, 1899.)
(No Model.) 5 Sheets—Sheet 4.
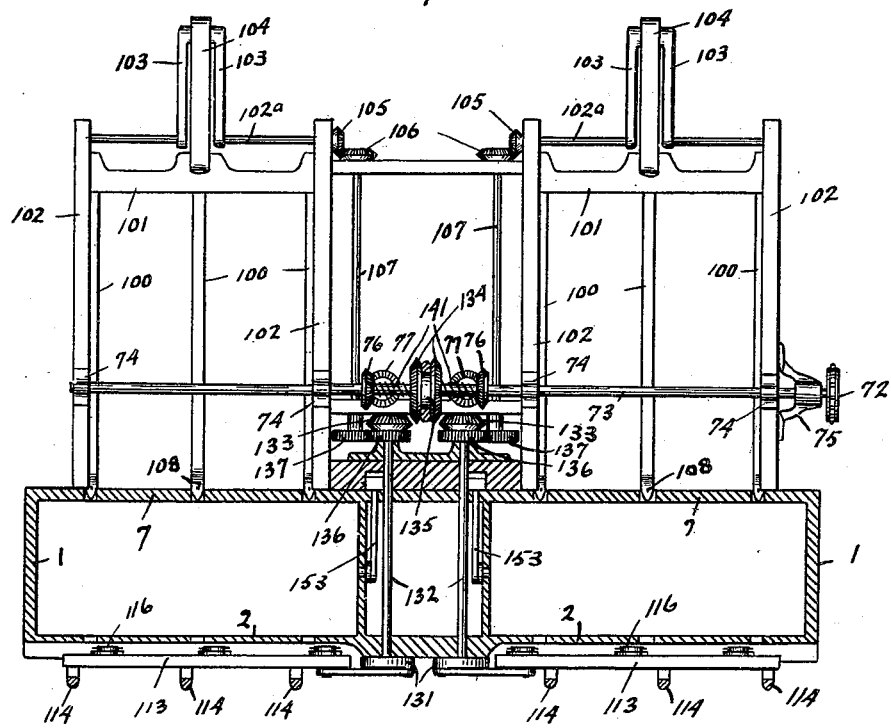
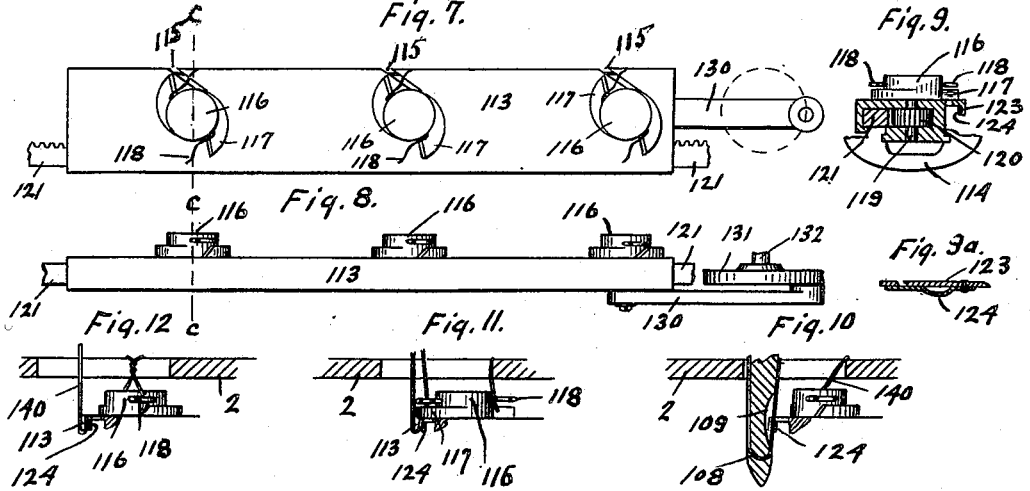
Witnesses,
H. C. Wilkinson
Jacob E. Fine
Inventor
Wm. B. Leonard
by George S. Black
His Attorney.

No. 647,974. Patented Apr. 24, 1900.
W. B. LEONARD.
BALING PRESS.
(Application filed Mar. 2, 1899.)
(No Model.) 5 Sheets—Sheet 5.
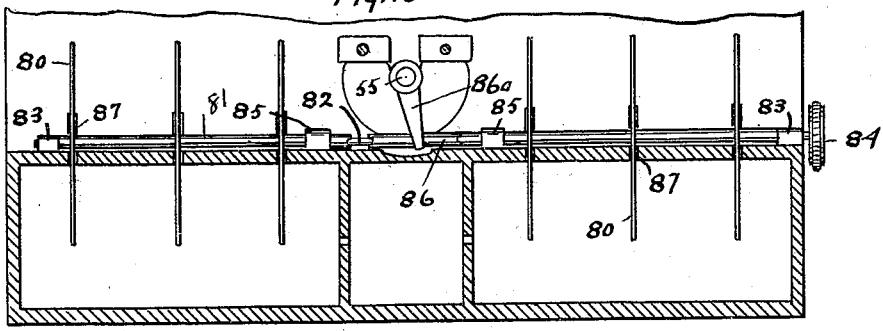
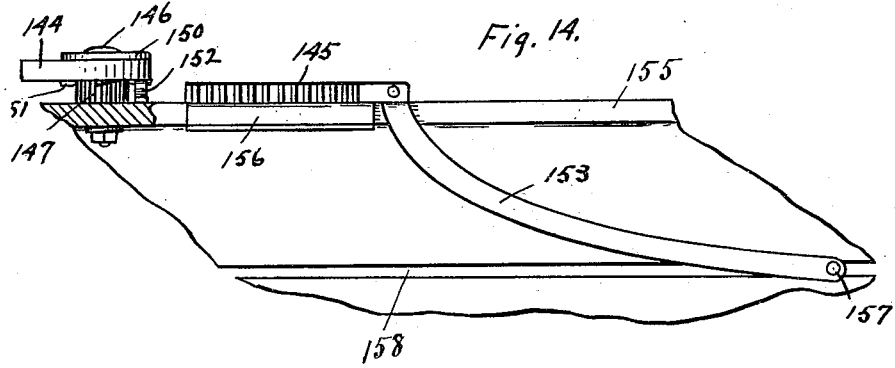
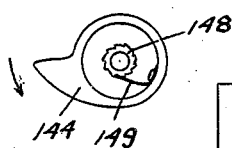
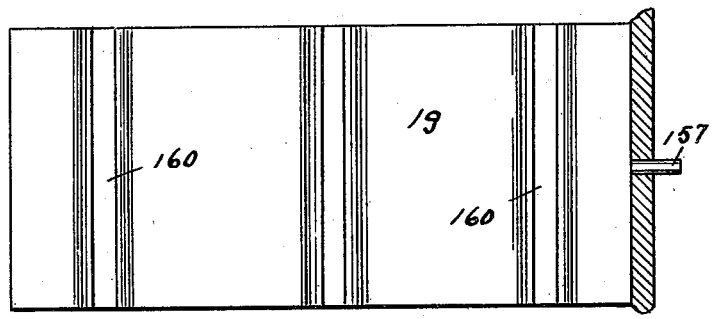
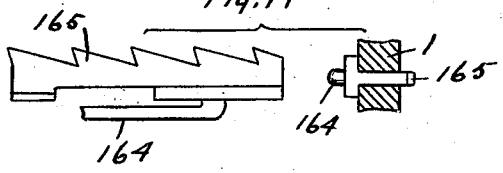
Witnesses,
H. C. Wilkinson
Jacob E. Finn
Wm. B. Leonard
Inventor
by George S. Black
His Attorney

UNITED STATES PATENT OFFICE.

WILLIAM B. LEONARD, OF WALLACE, INDIANA.

BALING-PRESS.

SPECIFICATION forming part of Letters Patent No. 647,974, dated April 24, 1900.

Application filed March 2, 1899. Serial No. 707,438. (No model.)

*To all whom it may concern:*

Be it known that I, WILLIAM B. LEONARD, a citizen of the United States, residing at Wallace, county of Fountain, State of Indiana, have invented certain new and useful Improvements in Straw and Hay Balers, of which the following is a specification.

My invention relates to an improvement in baling-presses, and has been so constructed and provided with duplicate parts that the product being baled may be supplied continuously. This feature adapts it as an attachment for threshing-machines, where it may be substituted for the stacker or fastened onto the back end of the thresher to receive the straw and bale it as the grain is being threshed out.

The use of my machine is not limited to an attachment for threshing-machines; but by the addition of an elevated table it may be used as any other press, except that the hay or other product being baled may be supplied continuously, if desired.

To carry out the object of my invention, I build my machine in duplicate and provide a shifting elevator to carry the straw first into one press and then into the other. While the straw is being supplied to one press, that press remains inoperative and the other press is in operation. The shifting elevator is then changed simultaneously with the change in the operation of the presses.

The full nature of my invention will be clearly understood from the following references to the drawings and the claims.

Figure 1:
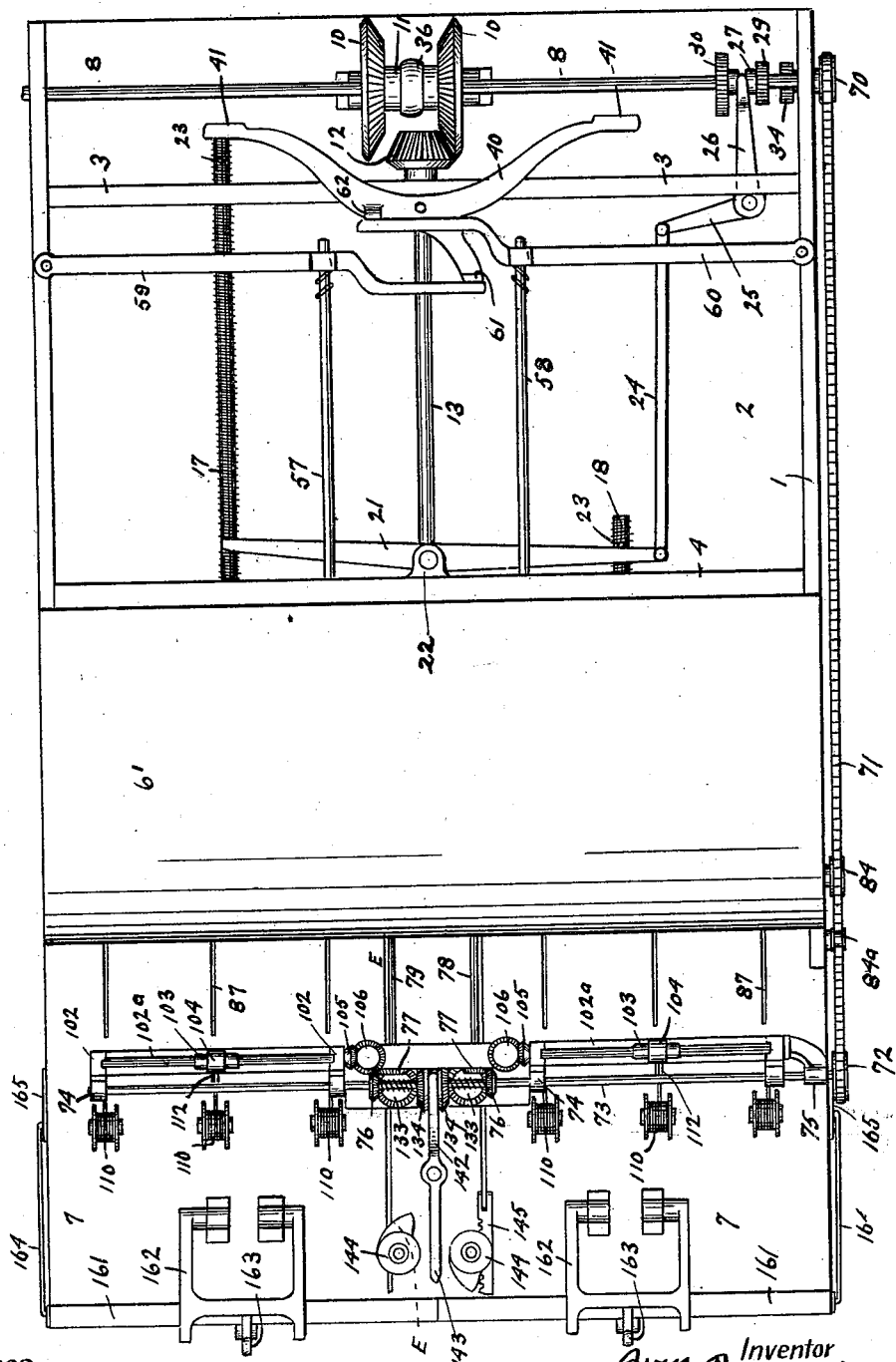
Figure 2:
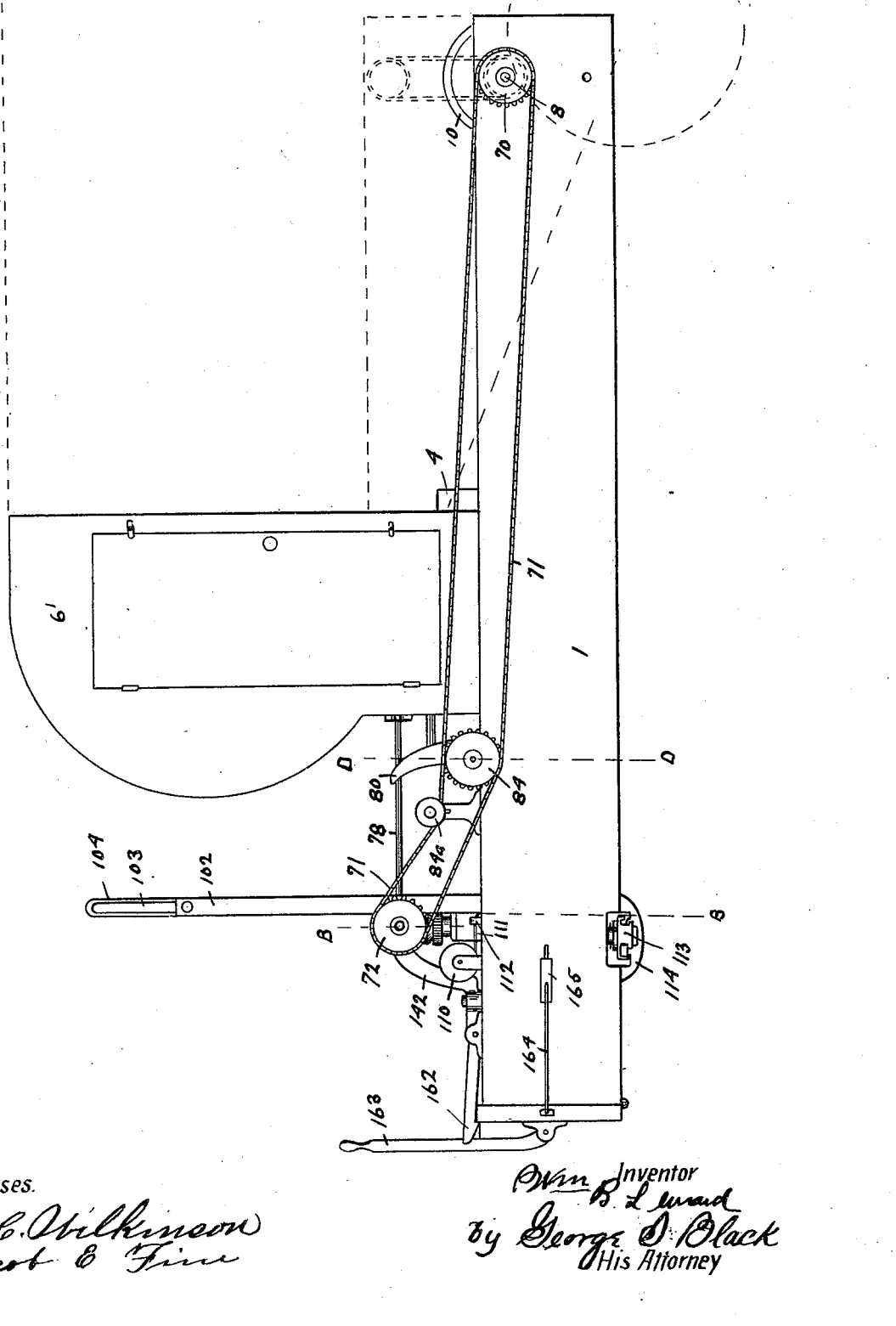
Figure 3:
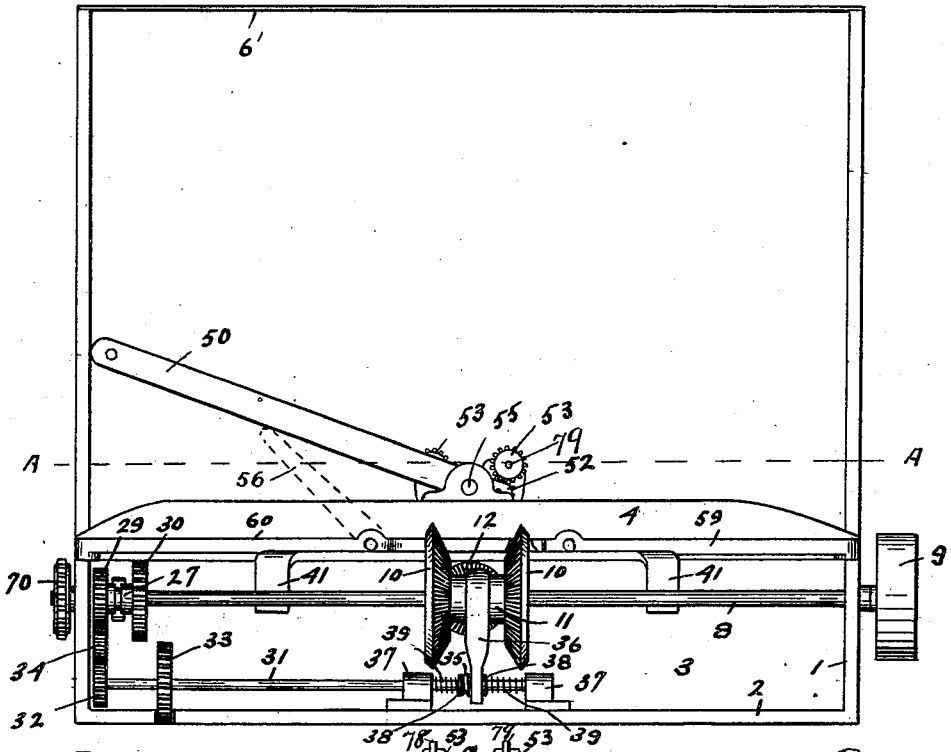
Figure 4:
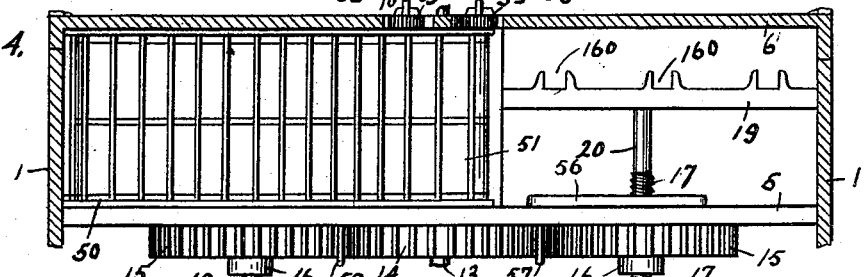
Figure 5:
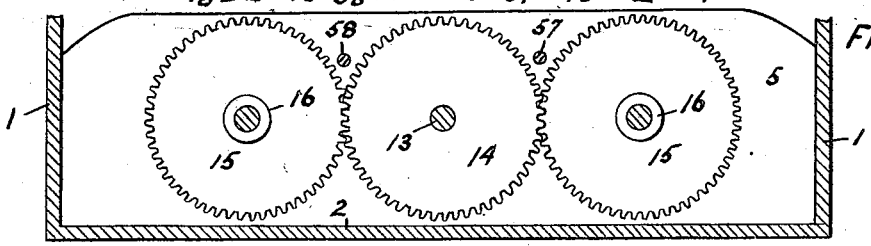

Figure 1 represents the plan view of my machine. Fig. 2 is an elevation thereof, showing by dotted lines the back end of the separator and also by dotted lines an elevator or carrier-table attached as when used away from the thresher. Fig. 3 is a right-hand elevation of Fig. 1, showing the driving mechanism and shifting-gears for reversing. Fig. 4 shows a plan of the shifting elevator and adjacent gearing with the incasing frame cut through A A of Fig. 3. Fig. 5 shows an elevation of the large gears shown in plan in Fig. 4. Fig. 6 shows a section approximately on line B B of Fig. 2 and illustrates the tying mechanism. Fig. 7 shows a plan of the shuttle. Fig. 8 is an elevation of the shuttle shown in Fig. 7. Fig. 9 shows a section on the line C C of Figs. 7 and 8. Fig. $9^a$ is a sectional view of the spring for engaging and holding the wires in the shuttles. Fig. 10 shows the needle at its lowest position and the shuttle taking the thread. Fig. 11 illustrates the same with needle withdrawn. Fig. 12 shows the wire twisted or the final step in the fastening of the ends of the wire. Fig. 13 is a section on line D D of Fig. 2 and shows the packing-fingers and their mountings. Fig. 14 shows a partial section approximately on the line E E of Fig. 1, with the engaging rack near the back end of its movement. Fig. 15 is a plan of the ratchet-cam, shown in elevation at the left hand in Fig. 14, the top being removed to show the ratchet. Fig. 16 is an elevation of the engaging end of the press-plate, showing on the inner side the frame in section. Fig. 17 is a plan of the engaging teeth which withdraws the bales from the press after they are tied.

In detail the framework of my machine is made up of the side boards 1, which extend along the sides from end to end and are held rigidly in place by the bottom 2, the cross-partitions 3, 4, and 5 supporting and forming bearings for the shaft running longitudinally of the machine, the shifting elevator casing 6', and the top 7 of the rearward portion.

Within the frame 1 I mount the driving-shaft 8, carried in suitable bearings attached to the frame. This shaft being rotated by a belt from a driving-pulley at some convenient place on the separator transmits power to the pulley 9, fastened to the shaft shown in Fig. 3. This driving-shaft and its connections or attachments are clearly illustrated in Figs. 1 and 3. It is also shown in end elevation of Fig. 2. Near the middle of this driving-shaft are slidably mounted the bevel-gears 10, which gears are feathered to the driving-shaft, or this portion of the shaft may be made square in section and the gears so mounted that they can have a lateral movement, but must rotate with the shaft. These gears are fastened to a spacing-collar 11, which keeps them both from engaging with their follower 12 at the same time. The gears 10 are also mounted on the shaft in an opposite position, face to face, so that with the driving-shaft always revolving in the same direction the bevel-gear 12 will be reversed as its contact is changed from one driver to the other. This bevel-gear 12 is rigidly mounted on the end of a shaft 13, extending at right angles to the driving-shaft 8 and rotatably carried in bearings secured to the partitions 3 and 4. On the other end of the shaft 13 and between the partitions 4 and 5 I secure a spur-gear 14, meshing on either side with the similar gears 15, to be seen in Figs. 4 and 5. The spur-gears 15 differ from their driver 14 in that their large hub 16 supports them in suitable bearings in the partitions 4 and 5. The hubs 16 of the gears 15 are threaded, one right and one left, to receive the screws 17 and 18. To the rear end of each of these screws are attached the press-plates 19, only one being shown. (See Fig. 4.) A portion 20 of the screws 17 and 18, near the press-plates, is smooth or not threaded, so that when the press-plate, through the action of the screws, reaches its forward position, abutting against the partition 5, the screws will turn freely in said threaded hubs 16, allowing gears 15 to revolve without communicating motion to the screws. Between the screws 17 and 18 and just over them is mounted a lever 21, pivoted half-way between them in the bracket 22, secured to the partition 4. Near the ends of the screws opposite the press-plates are the upwardly-extending pins 23, fastened to the screws and engaging the lever 21 when the screws approach their rearward movement. One end of the lever 21 is extended beyond the screw 18 and is pivotally connected to a link 24, the other end of said link pivotally connecting with a bell-crank 25. This bell-crank swings in a suitable bearing, which is fastened to the partition 3, and another arm 26, passing through said partition, engages in a recess of a collar 27, feathered to the driving-shaft 8. By this engagement with the collar 27 the bell-crank controls its lateral motion along the shaft, allowing it to revolve with the shaft. To the collar 27 are attached the spur-gears 29 and 30.

Below the shaft 8 (to be seen in Fig. 3) and rotatably mounted in suitable bearings is the reversing shaft 31. Rigidly keyed to this shaft are the spur-gears 32 and 33, the gear 32 meshing with an idle gear 34, journaled in the side of the casing between shaft 8 and shaft 31. These gears are so mounted with relation to the gears 29 and 30 on the shaft 8 that by sliding the collar 27 along the shaft the gear 29 may be engaged with the gear 34, or the gear 30 may engage the gear 33, but both sets of gears cannot be in engagement at the same time. It will be noticed that with the shaft 8 always revolving in the same direction shaft 31 will be reversed by changing from one of these driving-gears to the other.

Near the inner end of shaft 31 is secured a short screw 35, which screws through the lower end of a depending arm 36. The upper end of the arm 36 is carried in a recess of collar 11, and by this connection controls the lateral movement of the collar on the shaft 8. On either side of the screw 35, at some distance from it, are the bearings 37, and loosely carried on the shaft on each side of the screw, between it and these bearings, are washer-like collars 38. Between these collars and the bearings 37 and about the shaft 31 are the spiral springs 39. The use of these springs and collars is to keep the arm 36 always in contact with the screw 35. When the shaft 31 moves in the right direction, the arm 36 will be carried over the screw 35, thus moving one of the bevel-gears 10 out and the other into engagement with the gear 12. The screw 35 being short limits this lateral movement, and as soon as the arm 36 has passed over the screw it stops, but remains against the screw, being held there by the spring 39 on that side. The arm 36 will then remain at rest until the shaft 31 is reversed, when it will be carried back again, reversing the bevel-gear 12.

We may now readily understand the action of the reversing mechanism. As shown in Fig. 3, the gear 29 is driving the shaft 31 and with the screw cut as it should be will move the bevel-gears 10 to the left. The screw 18 will then be moved by the action of gear 15 to the position shown in Fig. 1. The pin 23 coming in contact with the lever 21 will, through the link 24 and the bell-crank, throw the gear 29 out of engagement with the idler 34 and gear 30 into engagement with the gear 33, thus changing the direction of rotation of shaft 31, and by means of the screw 35 the bevel-gears 10 will be thrown back into the position shown in Fig. 1, whereby the screw 18, through the action of said gears and gears 12 on shaft 13, will move toward the front of the press until the threaded portion thereof has passed through the hub 16. Again referring to Figs. 1 and 3, a lever 40 is shown extending horizontally above and between the screws 17 and 18. This lever 40 is pivotally mounted near its middle and secured to the partition 3. It is of such a shape as not to interfere with the gears 10 and 12 and at its ends has depending lips 41, which drop in front of the screws 17 and 18 and engage with them when they are in their forward position. As shown in Fig. 1, the screw 17 is at the forward end of its stroke, and the gear 15 at this time is revolving freely around the unthreaded part 20 of the screw, and therefore does not engage with the threads to drive the same. The forward end of screw 17 bears against the lip 41 of the lever 40. When screw 17 first comes in contact with the lip 41 of the lever 40, the gear-wheel 15 is screwing the screw 17 to a forward position, and finally disengages itself when the part 20 of the screw is reached. As screw 18 advances from its forward position to the position shown in Fig. 1 the gear 15, operating screw 17, is still turning in a direction which tends to disengage said screw. When the screw 18 reaches the position shown in Fig. 1, the gears 15 are reversed; but the threaded portion of the screw 17 is clear of the gear 15 and will not at this time be affected by the change in direction of rotation. The screw 18, however, will be carried forward until its forward end engages with the lip 41 in front of it. As soon as the screw 18 engages lip 41 of lever 40, tending to push it forward, the other end of the lever 40 will be pushed rearward, and the lip 41 on that end will push the screw 17 back into engagement with the gear 15, which is now revolving in the right direction to receive it and carry it back. The screw 18 will now remain in a state of rest, having been fed the length of the screw, while the screw 17 moves backward, reaching the limit of its movement in that direction and reversing the driving mechanism, then returning forward and again starting the screw 18 on its movement, while the screw 17 remains at rest. This alternate moving and stopping of the screws will be continuous as long as the machine is running.

The elevator 50 (to be seen in elevation in Fig. 3 and in plan in Fig. 4) is pivoted in suitable bearings half-way across the machine, the upper end resting against the sides of the casing 6; or this casing may have suitable bearings attached to it to receive and hold the elevator. The carrier or canvas 51 of this elevator is carried on suitable rolls at the upper and lower ends. The driving-roll at the bottom has on its journal, at the rearward end, a gear 52, meshing with a driving-gear 53. There are two of these gears 53, so placed at each side of the gear 52 that when the elevator, which is free to be moved about its pivot 55, is moved from one side of the machine to the other the gear 52 is disengaged from one of the wheels 53 and engages the other. The gears are driven so as to revolve in opposite directions. The gear 52 will thus be reversed when the elevator 50 is moved from one side to the other.

To swing the elevator from one position to the other there are provided the levers 56. (Shown in dotted lines in elevation in Fig. 3 and in plan in Fig. 4.) These levers 56 are placed just back of the partition 5 and under the forward side of the elevator, one on either side of the machine, that the elevator may be thrown from the one side to the other by raising the lever below it. The levers 56 are secured to the ends of the horizontal forwardly-extending shafts 57 and 58, which shafts have bearings in the partition 5. The bearings of the shafts 57 and 58 are such as to allow them to rotate about their axis, but allowing them no lateral movement. The forward ends of shafts 57 and 58 have bearings in the arms 59 and 60, to be seen in Fig. 1. The arms 59 and 60 are pivotally carried at one end on the frame 1, the other end resting on an extension of the lever 40. The lugs 61 and 62 on the lever 40 bear against the arms 59 and 60. The bearings for the shafts 57 and 58 in the arms 59 and 60 are threaded, but with an opening large enough to admit the smooth shaft. Just back of these arms, as shown in Fig. 1 in their normal position, the shafts 57 and 58 are enlarged and threaded, one right and one left. The inner ends of the arms 59 and 60 are so bent that they may be swung through a short arc without interfering with each other. The operation of these shifting-levers, which lift the elevator from one side to the other, can now be explained.

With the elevator 50 in the position shown in Figs. 3 and 4 the press-plate 19 will be at rest against the partition 5, (it having been placed away from this partition in the drawings that the smooth portion 20 of the screw 17 might be illustrated.) In the operation of the machine, however, the plate 19 on the screw 17 will always be at rest and against the partition 5 when the elevator 50 occupies the position shown. The screw 17 being at rest will occupy the position shown in Fig. 1, the screw 18 being in motion. As soon as the screw 18 reaches the limit or is near the limit of its forward movement that end comes in contact with the lever 40, swinging it about its pivot, and throwing the lug 62, and with it the arm 60, to the rearward. This movement of the arm 60 causes the threaded portion of the shaft 58 to enter the threaded bearing in said arm, and thus to revolve and lift the arm 56, fastened to it. This arm lifts with it the elevator 50, which, after leaving the arm, falls back to the opposite side of the machine. At the same time the movement of the endless carrier of the elevator is reversed, and the screw 18 reaching the limit of its rearward movement starts the screw 17 on its rearward or pressing movement. When the screw 17 reaches the limit of its forward movement, the lug 61 operates the arm 59, shaft 57, and lever 56, and the elevator is thrown back the same as it was thrown out from the other side.

On the end of the driving-shaft 8, on the outside of the frame and opposite the end on which is mounted the driving-pulley 9, is secured a sprocket-wheel 70, which drives the chain 71, to be seen in Figs. 1 and 2. This chain passes to the rear of the machine over a sprocket-wheel 72, which is secured to the end of a horizontal shaft 73. This shaft, provided with suitable bearings 74 and 75, is the driving-shaft for the tying mechanism. It also drives the elevator, and for the purpose is provided with the bevel-gears 76, which mesh with the bevel-gears 77, secured to the end of the forwardly-extending shafts 78 and 79. These latter shafts are provided with suitable bearings near each end and have secured to their forward ends the gears 53, which engage with the gear 52 of the elevator, as has been explained.

The straw delivered from the elevator falls into the press, tending to bunch up just below the elevator. That more straw may be delivered before the pressing is begun there has been provided tedding or packing fingers 80. (Shown in Figs. 2 and 13.) These fingers are secured to hollow shafts 81, through which passes the driving-shaft 82. The shaft 82 is mounted in suitable bearings 83, near its ends, and has secured to its end the sprocket-wheel 84, which engages with and is driven by the chain 71. This chain is guided into contact by the idle pulley 84. There are two sets of these packing-fingers, one for each press. The shaft 81 has end bearing against the bearing 83 and is rotatably carried in the bearing 85. The inner end is notched to receive a collar 86, which is feathered to the driving-shaft 82. This collar is of such length as to form a shipper—i. e., when at one end of its movement it engages one of the hollow fingered shafts 81 and is out of engagement with the other, and vice versa. That this shipping of the tedding-fingers may be performed automatically, the pivot 55 of the elevator is extended rearwardly and has fastened to its end a depending arm 86ª, which is so attached to the collar 86 as to allow it to rotate and at the same time control its lateral movement on the driving-shaft 82. The fingers by the construction just explained are thrown into and out of operation as the elevator is changed—i. e., when the elevator is set to carry straw into one press the packing-fingers in that press are thrown into operation and the ones in the other press are rendered inoperative. This driving mechanism for the packing-fingers is located just back of the casing containing the elevator and just over the press, slots 87 in the casing and the top of the press allowing the fingers to pass through and do their work in the press.

Six needles 100 have been provided for tying the bales, three for each press. The three for each press are connected at their tops by a cross-beam 101, which beam, together with the two outer needles, is slidably mounted in the upright posts 102. Above the needles and rotatably mounted on these posts are the horizontal shafts 102ª, having at their middles the crank 103. The link 104 connects the crank 103 to the cross-beam 101, where it is pivotally secured. On the inner end of shaft 102ª is secured the bevel-gear 105, meshing with the bevel-gear 106 on the upper end of the vertical shaft 107. The lower ends of the needles 100 are pointed and shaped as shown in the section in Fig. 10, having an eye 108 near the front, and are hollowed out just above this eye, at 109, as shown. The wire for tying is carried on the reels 110, which are carried on suitable supports fastened to the top 7 of the press. From these reels the wire 111 passes through a tension-piece 112, to be seen in Figs. 1 and 2. It passes from thence to the eye of the needle, which carries it, as is to be explained.

Below each press a shuttle 113 is slidably mounted in cross-pieces 114, secured to the bottom of the press. The shuttles and their attachments are made rights and lefts. In Figs. 7, 8, and 9 one of these shuttles and its connections are clearly shown. The top of the shuttle is a smooth plate, with the notches 115, for catching the wire, so arranged and spaced as to receive the wire from the needles, each slot being opposite a needle at the time the wire is caught. Projecting above the surface of the shuttle are the three twisting-cams 116. One of these cams is clearly shown in elevation in Fig. 9. Next to the top plate 113 of the shuttle are the cutting-knives or shearing-cutters 117, forming a part of the cams 116. The upper part of the cams are round, having attached thereto the holding-springs 118. The cams 116 are pivotally secured to the shuttle-frame by the journals 119, which have secured to them the spur-gears 120. These gears mesh with a rack 121, secured to the cross-bars 114. The journal of the inner cams 116 extends through the shuttle-frame and has pivotally attached to it the operating-link 130. The shuttle-frame or top plate of the frame has a depending lip or rib 123 on its front edge, back of which is fastened a flat spring 124, which extends across the slot 115, as shown in Fig. 7 and clearly shown in Figs. 9 and 9ª, where the top of 113 has been cut off to expose the relation and shape of this spring. The spring 124 bears against the lip 123, except for a short distance close to where they are attached or fastened, at which place the spring is bent away from the rib in order that short pieces of wire left between the rib and the spring may be crowded out and not render the spring inoperative for attaching another wire. The links 130 connect the inner and extended journals 119 of the inner cams 116 to the crank-wheel 131 on the lower end of the vertical shafts 132. These shafts pass through the frame between the presses, being held in suitable bearings and carrying at their upper ends the bevel-wheels 133, which engage with the bevel-gears 134, carried on the shaft 73. The bevel-wheels 134 are secured on the collar 135. This collar is fastened to the shaft 73. The arrangement is such that only one set of the bevel-gears 133 and 134 can be engaged at the same time, and by shifting the collar 135 one set is thrown out of gear and the other set thrown in, or by stopping midway they are both out of gear. Just below the bevel-gears 133 and secured to the same shaft 132 are the spur-gears 136, meshing with the gears 137, secured to the lower ends of shafts 107, which drive the needles.

The action of the needles and shuttle can now be readily understood. As the needles start downward, the shuttle starts its reciprocating movement, being driven by the crank-wheels 131 through the link 130. As the shuttle is moved, the twisting-cams 116 revolve on their axis. The needle descends to the position shown in Fig. 10, when the wire is caught by the shuttle in the slots 115 and between the rib 123 and spring 124. Here it may be explained that the point of the needle is made tapering, so that the extreme point descends and clears the shuttle, and the wire is carried against the shuttle and readily drops in the slots 115 when they are brought to the wire. The needle is then withdrawn, leaving the wire looped in the shuttle, as shown in Fig. 11. The shuttle then starts in the opposite direction, it being so geared, and the springs 118 on the twisting-cams engage the wire next to the cams, and the knives 117 then shear the wire off. The opposite spring 118 having previously received a wire, which it carries, the two wires are twisted as the cams 116 continue to revolve. The twisted wire is shown in Fig. 12. The wire 140 (shown in Fig. 12) is now held by the spring 124 and is on the outside of the lip 123. As the straw in the press is pushed back or pressed this wire will be slanted toward the cam 116 and will lie in such a position that when the shuttle is started again the wire 140 will be pushed into the slot by the spring 118 and then, when the cam is turning in a forward direction, it will be caught between the spring and cam and cut off, leaving it in the position shown in Fig. 10, when the needle again descends and the operation just described is repeated.

When the bale which has been tied is pushed away, the shuttle being at rest, as will soon be explained, the ends of the wires below the twist will slide out from between the shuttle and the spring 124.

The shifting of the collar 135, which throws the tying mechanism in and out of gear, is operated automatically. The gears 134 are held out of engagement with the gears 133 by the spiral springs 141 pressing against the collar 135. The collar 135 is operated in its lateral movement by the lever 142. (Shown in Figs. 1 and 2.) This lever fits loosely around the collar and thus forming a collar or yoke around it. A section of this outer collar is shown in Fig. 6. The lever 142 is pivotally secured to the top 7 of the press and has a rearwardly-extending arm 143. (Shown in Fig. 1.) The arm 143 is operated by the two cams 144. Fig. 14 shows an elevation of the left-hand cam 144 with its operating-rack 145. The rack operating the right-hand cam is shown in plan in Fig. 1. The cams 144 are pivotally secured to the top 7 of the machine by the bolts 146 and have between them and the top 7 the pinion-wheels 147. These pinions bear against the pivots 146 and have upwardly-extending hubs 148, (shown in Fig. 15,) whose upper ends form a ratchet-wheel, as shown. The cams 144 are hollow and contain the ratchet-springs 149, which engage the ratchet-hubs 148. The cams 144 are loosely carried on the pinions 147 and are held from slipping off by the covers 150, through which the bolts 146 pass. The depending lugs 151 on the under side of the cams 144 are engaged by springs 152, secured to the top 7 of the machine.

I will now refer to the operation of the cam on the left, the operation of both cams being the same.

As the rack 145 passes to the rearward it engages the pinion 147 and rotates the cam in the direction shown by the arrow in Fig. 15. The rack 145 is then moved forward, rotating the pinion; but the cam is kept from returning by the spring 152. The rack 145 is connected to the press-plate through the curved link 153, as shown in Fig. 14. This link is curved so as not to interfere with the elevator or gearing when at its forward position. The rack 145 is slidably carried in the slots 155 of the top 7 and is guided by the depending bearing 156, the lower part of which is flanged to prevent it being lifted out of the slot. The lower ends of the links 153 are journaled in the slots 158 by the pivots 157. The rack-pinion and cam are so geared that the press-plate is pushed rearward twice before the lip of the cam 144 engages the lever 143. On the third rearward movement of the press-plate the cam 144 engages this lever and throws the tying mechanism on that side into operation, the tying taking place while the press-plate is at the rearward part of its stroke. Before the press-plate returns the cam 144 has passed out of engagement with the lever 143 and the tying mechanism has been thrown out of gear by the spiral springs 141.

In Fig. 16 the engaging side of the press-plate or plunger 19 is shown, showing the recesses 160 in its surface in which the needles operate. After the bale has been tied the end or door 161 of the press is lowered by releasing the latch 162. This latch is released and the end 161, which is hinged on the bottom of the press, is lowered by the operating-lever 163. There are two of these operating-levers located on each side of the press end. Each of said levers is provided with an inwardly-extending lug to normally rest under the latch, so that as the lever is operated the latch is raised, or the latches may be raised manually, if desired. The latch 162 is hinged to the machine-top 7.

Attached to the end or door of the press by the link 164 is the gripping-plate 165. (Shown in Figs. 2 and 17.) This plate 165 slides in a slot in the side 1, and the teeth reaching to the inside of the press engage with the bale of straw and pull it out, the plate sliding rearward simultaneously with the lowering of the end of the press. There are two of these plates 165 for each press arranged on opposite sides to pull the bale onto the end as it is lowered. The bale is then removed by those operating the machine, and the end of the press is then lifted and latched in place to begin anew.

Briefly stated, the action of my machine is as follows: The straw is delivered into the elevator-casing 6, part falling into the press and part onto the elevator 50, which carries it into the same press as the other. The press is filled up and lightly packed by the fingers 80. The elevator is then thrown to the opposite side and the straw delivered to the other press at the same time the press-plate in the press just filled starts its operation. When the press-plate returns from its rearward movement, the elevator is again shifted and more straw is delivered to the press just packed. This operation is repeated until the press-plate passes the rear for the third time, when as it nears the limit of its movement the tying mechanism is started and the bale is ready to be removed. The two presses alternating enable the machine to work continuously.

What I claim, and desire to protect by Letters Patent, is—

1. In a device of the character described, the combination with the main frame, of a main drive-shaft journaled in the same, a reversing-shaft journaled near the drive-shaft, a plurality of gears upon the reversing-shaft, gears upon the drive-shaft adapted to be engaged by the gears on the reversing-shaft, a slidable collar on the drive-shaft adapted to throw the gears into operation with the gears on the reversing-shaft, press-plates or plungers, screw-shafts carrying the press-plates or plungers, a shaft provided with gears upon its ends for communicating motion from the drive-shaft to the screw-shafts, and a lever having connection with the collar on the drive-shaft and adapted to be actuated by the screw-shafts.

2. In a device of the character described, the combination with the main frame, of a main drive-shaft journaled in the same, a reversing-shaft journaled near the drive-shaft, gears upon the reversing-shaft, gears upon the drive-shaft adapted to be engaged by the gears on the reversing-shaft, a slidable collar on the drive-shaft adapted to throw the gears thereon with the gears on the drive-shaft, an elevator, press-plates or plungers, screw-shafts carrying the press-plates or plungers, a shaft provided with gears upon its ends for communicating motion from the drive-shaft to the screw-shafts, a lever having connection with the collar on the drive-shaft and adapted to be actuated by the screw-shafts, arms pivotally connected to the sides of the main frame, a lever having lugs adapted to engage the ends of the said levers when actuated by the screw-shafts, and shafts having screw ends engaging bearings in said pivoted arms, and their opposite ends carrying levers, by means of which the elevator is shifted as the screw ends are fed into the bearings of the pivoted arms.

3. In a device of the character described, the combination with the main frame, of a main drive-shaft journaled in the same, a reversing-shaft journaled near the drive-shaft, a plurality of gears upon the reversing-shaft, gears upon the drive-shaft adapted to be engaged by the gears on the reversing-shaft, a slidable collar on the drive-shaft adapted to throw the gears into operation with the gears upon the reversing-shaft, an elevator, press-plates or plungers, screw-shafts carrying the press-plates or plungers, a shaft provided with gears upon its ends for communicating motion from the drive-shaft to the screw-shafts, a lever having connection with the collar on the drive-shaft and adapted to be actuated by the screw-shafts, sliding frames carrying a series of needles, a plurality of shuttles, and connections between said parts and the main drive-shaft, substantially as described.

4. In a duplex baling-press, the combination with the main frame, of a drive-shaft journaled in the same, a reversing-shaft journaled near the drive-shaft, a plurality of gears upon the reversing-shaft, gears upon the drive-shaft adapted to be engaged by the gears on the reversing-shaft, a slidable collar on the drive-shaft adapted to throw the gears into engagement with the gears on the reversing-shaft, press-plates or plungers, screw-shafts carrying the press-plates or plungers, a shaft provided with gears upon its ends for communicating motion from the drive-shaft to the screw-shafts, a plurality of gears upon the drive-shaft adapted to alternately engage the forward gear of said shaft, a spacing-collar between the gears on the drive-shaft, a depending arm embracing the spacing-collar, an internally-threaded bearing formed in the bottom of said arm, a screw on the reversing-shaft adapted to be fed into said bearing, and a lever having connection with the collar on the drive-shaft and adapted to be actuated by the screw-shafts, substantially as described.

5. In a device of the character described, the combination with the main frame, of a drive-shaft 8 journaled in the same, gears located on said shaft, a shaft 13 having gears located on each of its ends, both of the gears on shaft 8 being adapted to be alternately thrown into operation with one of the gears on the shaft 13, screw-shafts 17 and 18 journaled in the main frame, and adapted to be operated by the shaft 13, press-plates or plungers operated by the screw-shafts, a lever 40 journaled in the main frame and adapted to be oscillated by the screw-shafts as they are fed forward, arms 59 and 60 pivoted at their outer ends to the main frame, interiorly-threaded bearings formed in shafts 59 and 60, shafts 57 and 58 provided with screw-threaded ends adapted to engage the same, and lugs on the lever 40, by means of which the shafts 57 and 58 may be alternately fed into the threaded bearings in the shafts 59 and 60.

6. In a device of the character described, the combination with the main frame, of a drive-shaft 8 journaled in the same, gears located on said shaft, a shaft 13 having on each of its ends gears, the gears on shaft 8 being adapted to be alternately thrown into operation with one of the gears on the shaft 13, screw-shafts 17 and 18 journaled in the main frame and adapted to be operated by shaft 13, press-plates or plungers operated by the screw-shafts, a lever 40 journaled in the main frame and adapted to be operated by the screw-shafts as they are fed forward, arms 59 and 60 pivoted at their outer ends to the main frame, interiorly-threaded bearings formed in shafts 59 and 60, shafts 57 and 58 journaled in said bearings and provided with screw-threaded ends adapted to engage the same, lugs on the lever 40 by means of which the shafts 57 and 58 may be alternately fed into the threaded ways in shafts 59 and 60, an elevator, and levers on the ends of shafts 57 and 58 to shift the said elevator as the machine is operated.

7. In a device of the character described, the combination with the main frame, of a drive-shaft 8 journaled in the same, gears located on said shaft, a shaft 13 having on each of its ends gears, the gears on shaft 8 being adapted to be alternately thrown into operation with one of the gears on the shaft 13, screw-shafts 17 and 18 journaled in the main frame and adapted to be operated by shaft 13, press-plates or plungers operated by the screw-shafts, a lever 40 journaled in the main frame and adapted to be operated by the screw-shafts as they are fed forward, arms 59 and 60 pivoted at their outer ends to the main frame, interiorly-threaded bearings formed in shafts 59 and 60, shafts 57 and 58 journaled in said bearings and provided with screw-threaded ends to engage the same, lugs on the lever 40 by means of which the shafts 57 and 58 may be alternately fed into the threaded bearings of the shafts 59 and 60, an elevator, levers on the ends of shafts 57 and 58 to shift the said elevator as the machine is operated, a lever 21 journaled on the frame of the machine, a bell-crank connected with one end of said lever for throwing the gears of the shaft 8 into operation with the gear of shaft 13, and means for engaging the screw-shafts with said bell-crank to operate the same.

8. In a device of the character described, the combination with the main frame, of a drive-shaft 8 journaled in the same, gears located on said shaft, a shaft 13 having on each of its ends gears, the gears on shaft 8 being adapted to be alternately thrown into operation with one of the gears on the shaft 13, screw-shafts 17 and 18 journaled in the main frame and adapted to be operated by shaft 13, press-plates or plungers operated by the screw-shafts, a lever 40 journaled in the main frame and adapted to be operated by the screw-shafts as they are fed forward, arms 59 and 60 pivoted at their outer ends to the main frame, interiorly-threaded bearings formed in shafts 59 and 60, shafts 57 and 58 journaled in said bearings and provided with screw-threaded ends to engage the same, lugs on the lever 40 by means of which the shafts 57 and 58 may be alternately fed into the threaded bearings in shafts 59 and 60, an elevator, levers on the ends of shafts 57 and 58 to shift the said elevator as the machine is operated, a lever 21 journaled in the frame of the machine, a bell-crank connected with one end of said lever for throwing the gears of the shaft 8 into operation with the gear of shaft 13, means for engaging the screw-shafts with said bell-crank to operate the same, a shaft having packing-fingers adapted to be operated from the main drive-shaft, a sliding frame having a series of needles, and a plurality of shuttles, all adapted to be operated from the main drive-shaft.

9. In a device of the character described, the combination with the pressing and elevating mechanism, of sliding frames journaled upon the main frame, a series of needles carried by said frame, gears for communicating motion to said frame from the main drive-shaft of the machine, a plurality of shuttles, cams to operate the same, wire-twisting cams to operate in the shuttles, ratchet-bars adapted to communicate motion from one to the other of said cams, and knives upon the twisting-cams to cut the tying material.

10. In a device of the character described, the combination with the pressing and elevating mechanism, of sliding frames journaled upon the main frame, a series of needles carried by said frames, gears to communicate motion to said frames from the main drive-shaft of the machine, a plurality of shuttles, cams to operate the same, wire-twisting cams operating in said shuttles, ratchet-bars adapted to communicate motion from one to the other of said cams, knives upon the twisting-cams to cut the tying material, rack-bars having linked connection with the press-plates or plungers, a plurality of cams located at the rear of the machine and adapted to engage the rack-bars, and a lever adapted to contact with the cams and alternately change the operation of the shuttles.

11. In a baling-press, the combination with the pressing and tying mechanism, of gripping-plates riding in ways in the sides of the main frame of the press, and a hand-lever to automatically unlatch the door of the press and operate the gripping-plates, substantially as described.

12. In a device of the character described, the combination with the pressing and tying mechanism, of a shifting elevator journaled in the main frame, a driving-roll for the same, a gear upon one end of the driving-roll, shafts journaled at each side of the driving-roll, gears upon the same adapted to alternately engage the gear on the driving-roll and operate the same as the elevator is shifted, and a depending arm fixed to the journal of the elevator to engage a shifting collar and reverse the pressing-fingers.

13. In a duplex operating-press, the combination with the pressing and elevating mechanism, of a plurality of sliding frames journaled upon the main frame, means for alternately changing the operation from one to the other of said frames, a series of needles carried by the frames, gears to communicate motion to said frames from the main drive-shaft of the machine, a plurality of shuttles having slots formed in their sides to receive the tying material, cams to operate the same, wire-twisting cams operating in said shuttles, ratchet-bars to communicate motion from one to the other of said cams, knives upon the twisting-cams to cut the tying material, springs on the cams to engage the tying material, and springs extending across the slots in the shuttles for holding the tying material during operation.

In witness whereof I have hereunto set my hand and seal this 26th day of January, A. D. 1899.

WM. B. LEONARD. [L. S.]

Witnesses:
H. C. WILKINSON,
JACOB E. FINE.